United States Patent
Crook et al.

(10) Patent No.: US 12,281,713 B1
(45) Date of Patent: Apr. 22, 2025

(54) BIOGAS DIGESTER CHECK VALVE

(71) Applicants: Brian Paul Crook, Montgomery, TX (US); Terry Lee Bares, Jr., Rayne, LA (US)

(72) Inventors: Brian Paul Crook, Montgomery, TX (US); Terry Lee Bares, Jr., Rayne, LA (US)

(73) Assignee: Southern Valve & Control, LLC, Broussard, LA (US)

( * ) Notice: Subject to any disclaimer, the term of this patent is extended or adjusted under 35 U.S.C. 154(b) by 66 days.

(21) Appl. No.: 18/387,805

(22) Filed: Nov. 7, 2023

Related U.S. Application Data

(60) Provisional application No. 63/431,275, filed on Dec. 8, 2022.

(51) Int. Cl.
| | |
|---|---|
| *F16K 15/04* | (2006.01) |
| *F16K 15/02* | (2006.01) |
| *F16K 27/02* | (2006.01) |

(52) U.S. Cl.
CPC ............ *F16K 15/04* (2013.01); *F16K 15/021* (2013.01); *F16K 27/0209* (2013.01)

(58) Field of Classification Search
CPC ..... F16K 15/04; F16K 15/021; F16K 27/0209
See application file for complete search history.

(56) References Cited

U.S. PATENT DOCUMENTS

| | | | | |
|---|---|---|---|---|
| 592,814 | A * | 11/1897 | McCann | F16K 15/04 137/533.15 |
| 1,085,013 | A * | 1/1914 | Bordo | F16K 15/04 137/329.04 |
| 2,388,481 | A * | 11/1945 | Green | F16K 15/04 137/202 |
| 5,437,300 | A * | 8/1995 | Winnie | G01F 15/005 73/201 |
| 6,286,538 | B1 * | 9/2001 | Fent | B60T 15/18 137/112 |
| 2009/0008591 | A1 * | 1/2009 | Gordon | F16K 15/021 251/332 |

* cited by examiner

*Primary Examiner* — P. MacAde Nichols
(74) *Attorney, Agent, or Firm* — Plager Schack LLP; Mark H. Plager, Esq.; Michael J. O'Brien, Esq.

(57) ABSTRACT

A biogas digester check valve assembly is configured to eliminate liquids in a methane gas gathering system. The biogas digester valve assembly has a cage retainer plate joined to a plurality of threaded valve cage rods. A valve pill float fits inside the plurality of threaded valve cage rods and against the cage retainer plate. A valve soft seat is joined to a soft seat retainer and the valve seat. A carrier base plate is joined to the valve seat and the plurality of threaded valve cage rods. A valve seat carrier is joined to the valve seat. A valve body top half is joined to the carrier base plate. A welded neck flange is joined to the carrier base plate with a check valve. The valve pill float locks the biogas digester valve to prevent liquids from leaving the methane gas gathering system and permitting methane gas to exit.

6 Claims, 3 Drawing Sheets

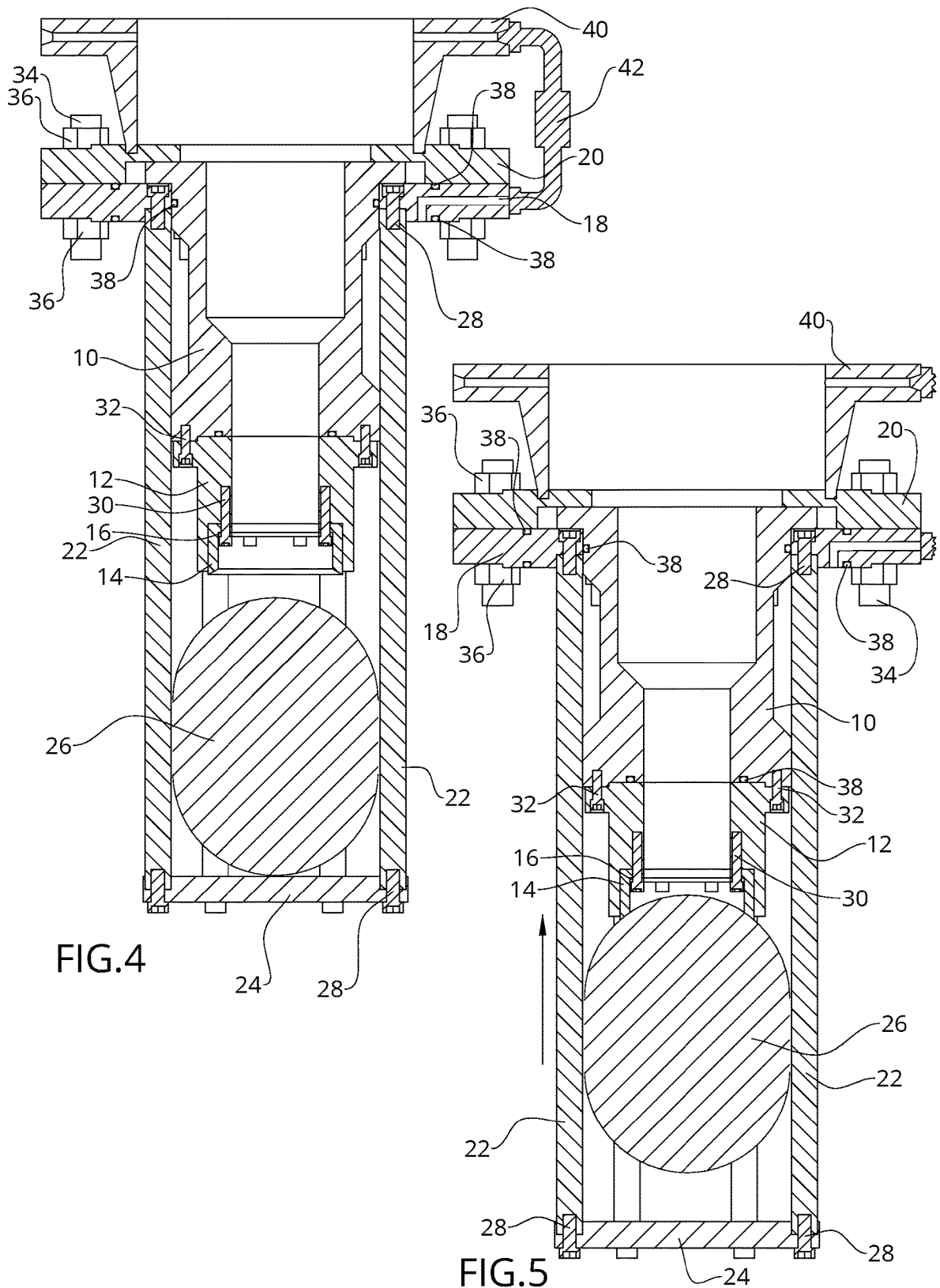

BIOGAS DIGESTER CHECK VALVE

RELATED APPLICATION

This application claims priority to provisional patent application U.S. Ser. No. 63/431,275 filed on Dec. 8, 2022, the entire contents of which is herein incorporated by reference.

BACKGROUND

The embodiments herein relate generally to capture of methane gas, methane/carbon dioxide mixed gases.

Prior to embodiments of the disclosed invention, the Biogas industry had problems with stopping liquids from entering the gas gathering system from a digester before gas was cleaned, compressed and sold for distribution. In the natural gas business, capturing liquids caused extended down times, cleaning of the gathering system and added equipment to dry the gas before it became sellable. Embodiments of the disclosed invention solve this problem.

SUMMARY

A biogas digester check valve assembly is configured to eliminate liquids in a methane gas gathering system. The biogas digester valve assembly has a cage retainer plate joined to a plurality of threaded valve cage rods. A valve pill float fits inside the plurality of threaded valve cage rods and against the cage retainer plate. A valve soft seat is joined to a soft seat retainer and the valve seat. A carrier base plate is joined to the valve seat and the plurality of threaded valve cage rods. A valve seat carrier is joined to the valve seat. A valve body top half is joined to the carrier base plate. A welded neck flange is joined to the carrier base plate with a check valve. The valve pill float locks the biogas digester valve to prevent liquids from leaving the methane gas gathering system and permitting methane gas to exit.

The cage retainer plate is joined to the plurality of threaded valve cage rods with the plurality of lower cage rod bolts. The valve soft seat is joined to the soft seat retainer and the valve seat with a plurality of soft seat retainer bolts. The carrier base plate is joined to the plurality of threaded valve cage rods with a plurality of upper cage rod bolts. The valve seat carrier is joined to the valve seat with a plurality of valve seat to carrier bolts and an O-ring. The carrier base plate is joined to the valve body top half with a plurality of threaded rods secured with a plurality of nuts.

BRIEF DESCRIPTION OF THE FIGURES

The detailed description of some embodiments of the invention is made below with reference to the accompanying figures, wherein like numerals represent corresponding parts of the figures.

FIG. 4 shows a section view of one embodiment of the present invention taken along line 4-4 in FIG. 1; and FIG. 5 shows a section view of one embodiment of the present invention showing the pill float movement.

DETAILED DESCRIPTION OF CERTAIN EMBODIMENTS

Figures 1, 2:
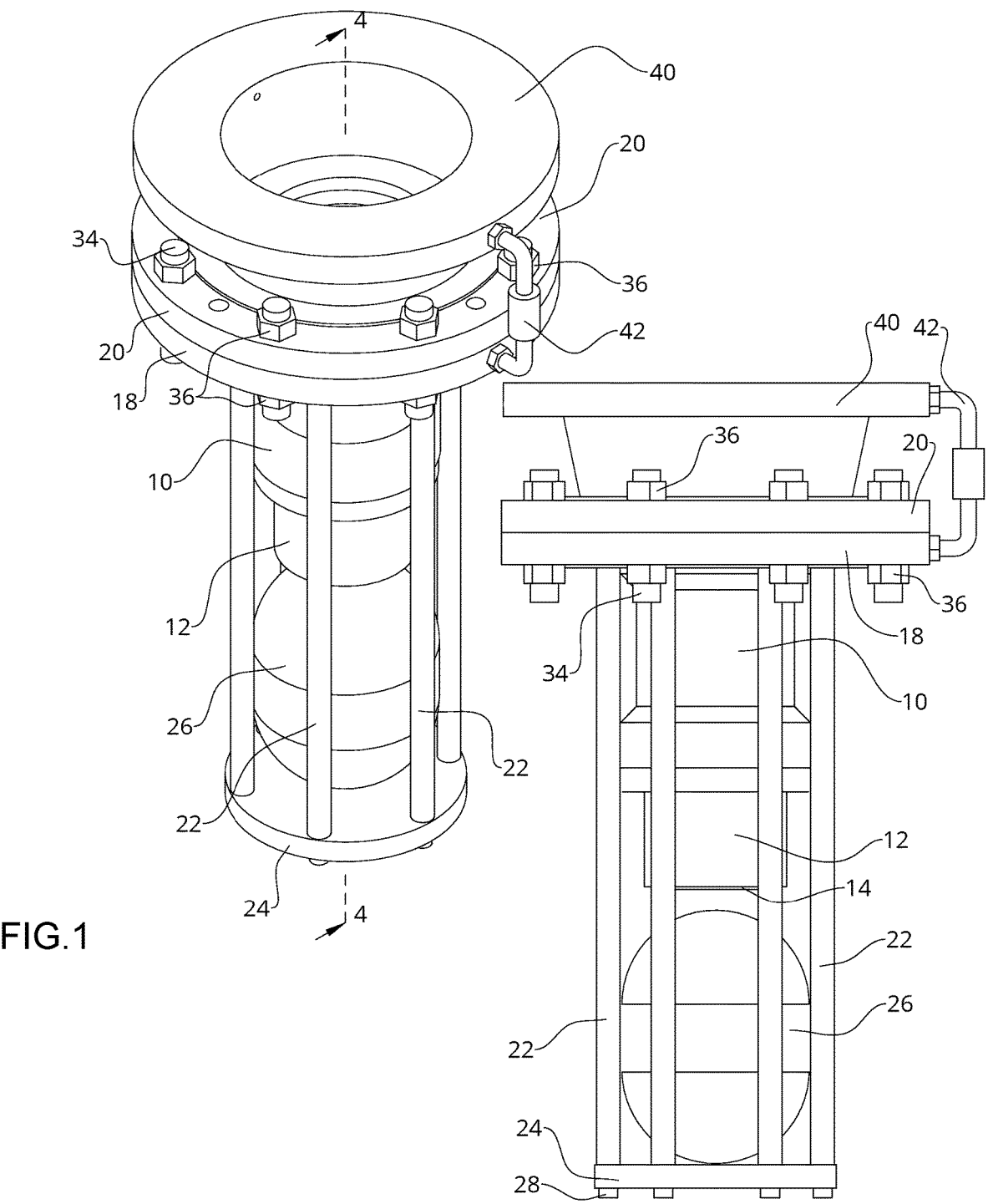
FIG. 1 shows a perspective view of one embodiment of the present invention.
FIG. 2 shows a front view of one embodiment of the present invention.
Figure 3:
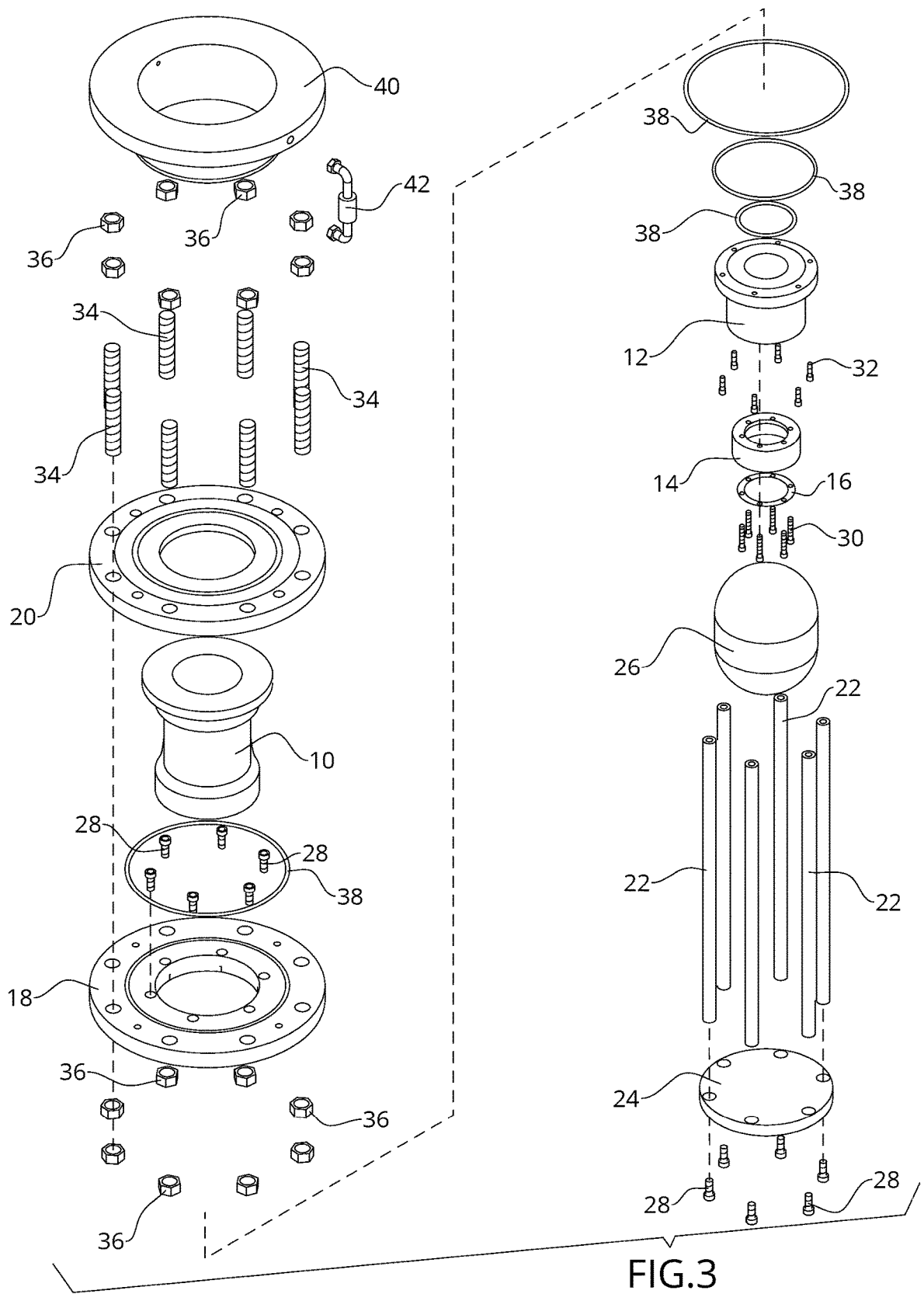
FIG. 3 shows an exploded view of one embodiment of the present invention.

By way of example, and referring to FIG. 1, one embodiment of a biogas digester check valve assembly comprises a cage retainer plate 24 joined to a plurality of threaded valve cage rods 22 with a plurality of lower cage rod bolts 28. A valve pill float 26 fits inside the plurality of threaded valve cage rods 22 against the cage retainer plate 24.

A valve soft seat 14 is arranged in a valve seat 12. A valve soft seat 14 is joined to a soft seat retainer 16 and the valve seat 12 with a plurality of soft seat retainer bolts 30. A carrier base plate 18 is joined to valve seat 12 with a plurality of valve seat to carrier bolts 32 with a plurality of O-rings 38.

The carrier base plate 18 is joined to the plurality of threaded valve cage rods 22 with plurality of upper cage rod bolts 28. A valve seat carrier 10 is joined to the valve seat 12 with a plurality of valve seat to carrier bolts 32 and an O-ring 38.

The carrier base plate 18 is joined to a valve body top half 20 with a plurality of threaded rods 34 secured with a plurality of nuts 36. A welded neck flange 40 is joined to the carrier base plate 18 with a check valve 42.

Turning to these components in more detail, the hatch seat carrier base plate is machined from solid stainless steel and features an O-ring grove as well has forms the bolted sealing compression between the digester hatch plate and the digester valve. The hatch seat carrier base plate also has bolting from the top and bottom to the valve body top half and the valve seat carrier. The valve body top half is bolted to the hatch seat carrier base plate. It is machined from solid stainless steel and the top and bottom side feature bolt holes. The top side is bolted to the customer provided piping using studs and sealing gaskets. The bottom side of valve body top half also has an O-ring sealing groove machined to retain a seal between it and the valve seat carrier. The valve seat carrier is bolted to the bottom side of the valve body top half. Both the valve body top half and the valve seat carrier have machined grooves to retain O-rings for sealing. The valve seat carrier has a precisely calculated and machined taper bore allowing a desired flow to pass across the machined outlet (orifice). The valve seat carrier is bolted to the valve seat on the bottom side. The underside lip of the seat carrier has a secondary O-ring seal and groove machined into its body. The valve seat is machined from solid stainless steel, it is bolted to the bottom of the valve seat carrier. The valve seat acts as a carrier to hold the valve soft seat retainer and the valve soft seat. The valve soft seat retainer retains the valve soft seat. The valve seat is the primary metal seat surface, the valve soft seat is the soft seat that seals against liquids and gases. The valve soft seat is machined from solid stainless steel with recessed bolt holes. When assembled it retains the valve soft seat to the valve seat. The valve soft seat is machined from elastomer designed to withstand high levels of hydrogen sulfide gas while providing the tight primary sealing surface on the valve pill float. The valve soft seat is machined to a radius that matches the valve soft seat is machined from elastomer designed to withstand high levels of hydrogen sulfide gas while providing the tight primary sealing surface on item #9 valve pill float.

The valve soft seat is machined to a radius that matches the radius on the pill float. The valve cage retainer plate is machined from solid stainless steel and is the bottom plate bolted to the cage rods. The cage rods are machined from solid stainless steel and bolt to the valve cage retainer plate on the bottom and the hatch seat carrier base plate. The cage rods are used to keep the valve pill floating in line and moving in a linear motion. The valve pill float is made of stainless steel filled with a pre-calculated amount of steel shot based on water density and weight of the empty pill. An anti-contamination mesh is made of stainless steel and is wrapped around the cage rods. The anti-contamination mesh prevents solids from entering the valve and is retained using item stainless steel hose clamps. The O-rings are made of an elastomer that can withstand high levels of hydrogen sulfide gas while providing a leak-proof sealing surface between metal-to-metal contact.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A biogas digester check valve assembly, configured to eliminate liquids in a methane gas gathering system; the biogas digester valve comprising:
    a cage retainer plate, joined to a plurality of threaded valve cage rods;
    a valve pill float, fit inside the plurality of threaded valve cage rods and against the cage retainer plate;
    a valve soft seat, joined to a soft seat retainer and the valve seat;
    a carrier base plate is joined to the valve seat and the plurality of threaded valve cage rods;
    a valve seat carrier, joined to the valve seat;
    a valve body top half, joined to the carrier base plate;
    a weld neck flange, joined to the carrier base plate with a check valve;
    wherein the valve pill float locks the biogas digester valve to prevent liquids from leaving the methane gas gathering system and permitting methane gas to exit.

2. The biogas digester check valve assembly of claim 1, wherein the cage retainer plate is joined to the plurality of threaded valve cage rods with the plurality of lower cage rod bolts.

3. The biogas digester check valve assembly of claim 2, wherein the valve soft seat is joined to the soft seat retainer and the valve seat with a plurality of soft seat retainer bolts.

4. The biogas digester check valve assembly of claim 3, wherein the carrier base plate is joined to the plurality of threaded valve cage rods with a plurality of upper cage rod bolts.

5. The biogas digester check valve assembly of claim 4, wherein the valve seat carrier is joined to the valve seat with a plurality of valve seat to carrier bolts and an O-ring.

6. The biogas digester check valve assembly of claim 5, wherein the carrier base plate is joined to the valve body top half with a plurality of threaded rods secured with a plurality of nuts.

\* \* \* \* \*